(12) United States Patent
Suu et al.

(10) Patent No.: US 8,750,519 B2
(45) Date of Patent: Jun. 10, 2014

(54) DATA PROTECTION SYSTEM, DATA PROTECTION METHOD, AND MEMORY CARD

(75) Inventors: Hiroshi Suu, Chigasaki (JP); Akihiro Kasahara, Chiba (JP); Akira Miura, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 964 days.

(21) Appl. No.: 12/472,977

(22) Filed: May 27, 2009

(65) Prior Publication Data
US 2009/0296937 A1    Dec. 3, 2009

(30) Foreign Application Priority Data

May 27, 2008  (JP) ................................. 2008-138428

(51) Int. Cl.
*H04L 9/00* (2006.01)
*G06F 21/62* (2013.01)
*G06F 21/12* (2013.01)

(52) U.S. Cl.
CPC .......... *G06F 21/6209* (2013.01); *G06F 21/123* (2013.01); *G06F 2221/2107* (2013.01)
USPC ............................................ 380/277; 380/45

(58) Field of Classification Search
CPC .............. G06F 21/123; G06F 21/6209; G06F 2221/2107
USPC ................................................ 380/45, 277
See application file for complete search history.

(56) References Cited

U.S. PATENT DOCUMENTS

| 6,912,513 | B1* | 6/2005 | Candelore ........................ 705/51 |
| 7,269,257 | B2* | 9/2007 | Kitaya et al. .................... 380/45 |
| 2003/0021417 | A1* | 1/2003 | Vasic et al. ..................... 380/277 |
| 2005/0005149 | A1* | 1/2005 | Hirota et al. ................... 713/193 |
| 2006/0242064 | A1* | 10/2006 | Jogand-Coulomb et al. ... 705/50 |
| 2007/0043769 | A1* | 2/2007 | Kasahara et al. .......... 707/104.1 |
| 2008/0010455 | A1* | 1/2008 | Holtzman et al. ............ 713/168 |

FOREIGN PATENT DOCUMENTS

JP        2006-5557        1/2006

* cited by examiner

*Primary Examiner* — Michael Chao
(74) *Attorney, Agent, or Firm* — Oblon, Spivak, McClelland, Maier & Naustadt, L.L.P.

(57) ABSTRACT

This data protection system encrypts and stores data in a memory card, using a double encryption key scheme for encrypting the data with a data key and further encrypting the data key with a user key. This system provides data to a particular host device from the memory card and limits provision of the data to other host devices. The host device includes DPS program that governs control of writing data to, and reading data from the memory card. The memory card includes a first non-volatile memory and a memory controller that controls the first non-volatile memory. DPSA program is implemented in the memory controller that manages ID information for identifying a user capable of decrypting the encrypted data with the user key.

14 Claims, 12 Drawing Sheets

FIG. 11

Initial State

| Holder | UkID / User ID | UkIDA0 | UkIDA1 | UkIDB0 |
|---|---|---|---|---|
| User A | A0 | Allowed (1) | Not Allowed (0) | Not Allowed (0) |
| User A | A1 | Not Allowed (0) | Allowed (1) | Not Allowed (0) |
| User B | B0 | Not Allowed (0) | Not Allowed (0) | Allowed (1) |

FIG. 12

Shared State

| Holder | UkID / User ID | UkIDA0 | UkIDA1 | UkIDB0 |
|---|---|---|---|---|
| User A | A0 | Allowed (1) | Not Allowed (0) | Allowed (1) |
| User A | A1 | Not Allowed (0) | Allowed (1) | Not Allowed (0) |
| User B | B0 | Not Allowed (0) | Not Allowed (0) | Allowed (1) |

DATA PROTECTION SYSTEM, DATA PROTECTION METHOD, AND MEMORY CARD

CROSS REFERENCE TO RELATED APPLICATIONS

This application is based on and claims the benefit of priority from prior Japanese Patent Application No. 2008-138428, filed on May 27, 2008, the entire contents of which are incorporated herein by reference.

BACKGROUND OF THE INVENTION

1. Field of the Invention

The present invention relates to a data protection system, a data protection method, and a memory card that enable protection of data being encrypted and stored on storage media, while allowing that data to be readily available to particular persons.

2. Description of the Related Art

Storage media such as SD cards are widely used as, e.g., so-called bridge media, for sharing data between multiple computers or the like (see, for example, Japanese Patent Laid-Open No. 2006-5557). In digital cameras, for example, recording image data on an SD card in a format compliant with the standard for digital still camera allows such image data to be utilized in other digital still cameras or personal computers compliant with the standard (which is known as interoperability).

Such interoperability, however, may have an adverse effect from the viewpoint of privacy protection. That is, due to the interoperability, one cannot restrict access by others to such image data stored in an SD card that he/she does not want others to see. Furthermore, if one lost the SD card on which image data is stored and if the SD card was found by a third party, the one cannot prohibit the third party from viewing the image data. Likewise, if any information is recorded on an SD card, such as business information or confidential documents, it is not possible to share it only among particular persons.

Some methods exist where the entire SD card is locked with a password in an attempt to share data among a number of particular persons, in which case, however, it is not possible to selectively protect only particular data, and password management or the like becomes an issue.

In addition, it is known, as a method of selectively protecting only particular data, to encrypt data files with passwords on a file-by-file basis. However, this method is not adequate to share data among the particular persons as mentioned above because the encryption key for use in encrypting data is protected at terminal side.

Therefore, it would be desirable to provide a data protection system that allows for protection of personal information and reduction of implementation load on host devices, while ensuring interoperability.

SUMMARY OF THE INVENTION

One aspect of the present invention provides a data protection system providing data to a particular host device from a memory card in which the data is stored, and limiting provision of the data to other host devices, the data being encrypted with a double encryption key scheme for encrypting the data with a data key and further encrypting the data key with a user key, the host device comprising: DPS (Data Protection System) program governing control of writing data to, and reading data from the memory card, the memory card comprising: a first non-volatile memory as a main storage device; a memory controller controlling the first non-volatile memory to govern encryption, decryption, read, and write of the data; DPSA (Data Protection System Agent) program implemented in the memory controller, the DPSA program encrypting the data with the data key and encrypting the data key with the user key according to an instruction from the DPS program, and then causing the encrypted data and the encrypted data key to be stored in the first non-volatile memory, whereas the DPSA program decrypting the encrypted data with the user key and the data key to read the data according to an instruction from the DPS program, and managing ID information that identifies a user capable of decrypting the encrypted data with the user key, in writing the data, the DPS program indicating to the DPSA program a storage location in the first non-volatile memory to store the data; the DPSA program encrypting the data with the data key to obtain encrypted data and further encrypting the data key with the user key to obtain an encrypted data key according to a write instruction from the DPS program, and then causing the encrypted data and the encrypted data key to be stored at the storage location in the first non-volatile memory, and in reading the data, the DPS program presenting user information that identifies the user to request the DPSA program to read the desired data, with reference to the ID information, and the DPSA program decrypting the encrypted data key with the user key corresponding to the presented user information to obtain the data key, and further decrypting the encrypted data with the data key to read the data to the host device.

BRIEF DESCRIPTION OF THE DRAWINGS

FIG. 11 illustrates an initial state of the ID table according to the embodiment;

FIG. 12 illustrates a shared state of the ID table according to the embodiment;

DETAILED DESCRIPTION OF THE EMBODIMENTS

A data protection system according to an embodiment of the present invention will now be described in detail below with reference to the accompanying drawings.

Figure 1:
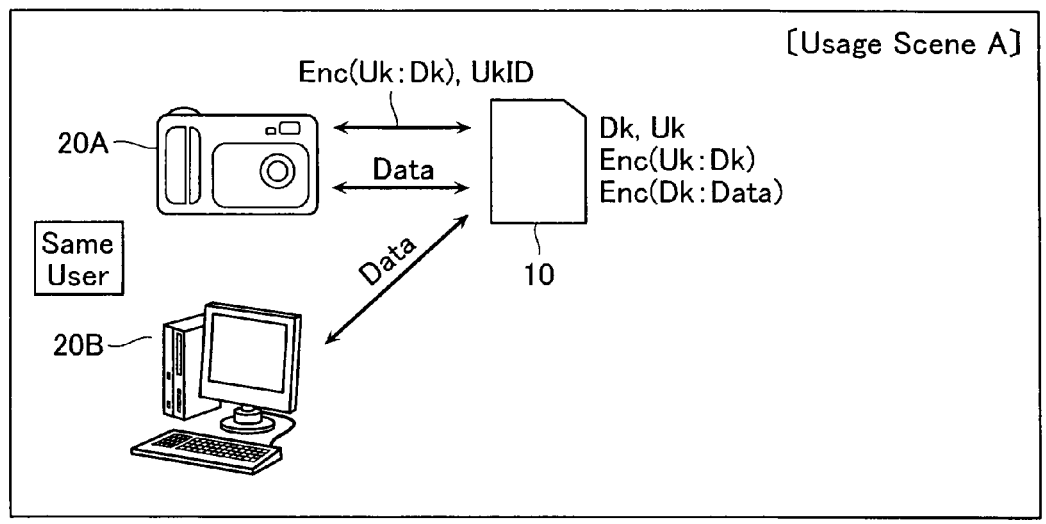
FIG. 1 is a conceptual diagram illustrating a mode of use (usage scene) in which the present invention may be implemented.
Figure 2:
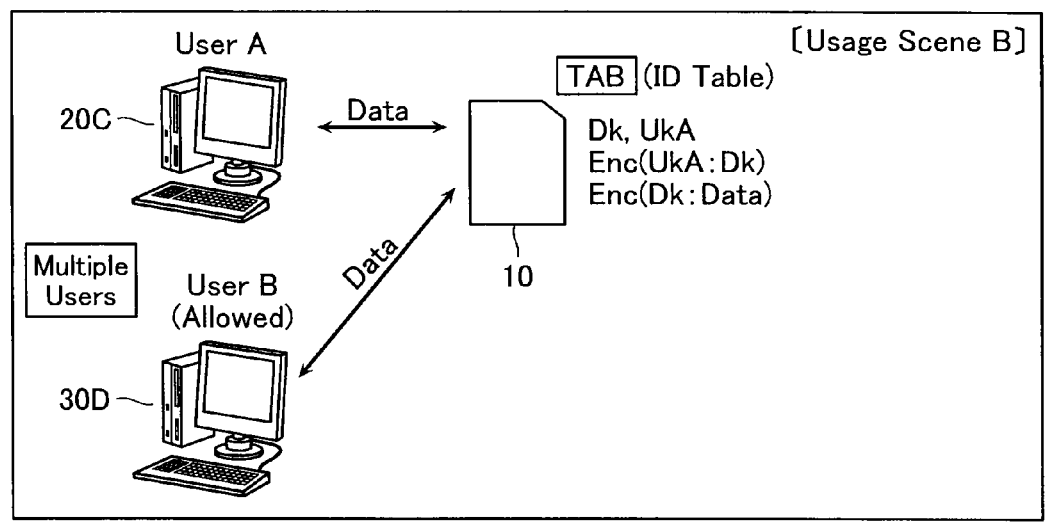
FIG. 2 is a conceptual diagram illustrating another mode of use (usage scene) in which the present invention may be implemented.

Referring first to FIGS. 1 and 2, description is made on a respective mode of use (usage scenes) in which the present invention may be implemented.

This data protection system may comprise an SD card 10, which is an example of storage media (memory card) for securely storing encrypted data with a double encryption key scheme, and a host device 20 using the encrypted data.

For example, as illustrated in FIG. 1, the SD card 10 first decrypts the encrypted data stored therein, and then provides the plaintext data to multiple host devices 20 (e.g., a digital camera 20A and a personal computer 20B) owned by the same user (Usage Scene A).

That is, according to this data protection system, data Data is stored in the SD card 10 that is encrypted with the double encryption scheme by means of a data key Dk prepared for each data and a user key Uk specific to the user. Specifically, the SD card 10 stores encrypted data Enc(Dk:Data) resulting from encrypting plaintext data Data with the data key Dk, and an encrypted data key Enc(Uk:Dk) resulting from encrypting the data key Dk with the user key Uk. The user key Uk is securely stored in the SD card 10 by encrypting or storing it in a protected area that is not freely accessible to the outside world.

Plaintext data Data is obtained when the data key Dk and the user key Uk are decrypted and the encrypted data key Enc(Uk:Dk) and the encrypted data Enc(Dk:Data) are decrypted, according to an instruction from a host device 20. The plaintext data Data is then read to the host device 20.

In addition, the host device 20 may write its own plaintext data to the SD card 10, with the plaintext data being encrypted with a double encryption key scheme. According to a write instruction from the host device 20, the SD card 10 generates or assigns a data key Dk as well as a user key Uk to generate encrypted data Enc (Dk:Data) as well as an encrypted data key Enc (Uk:Dk) which are in turn stored therein.

In this way, encryption and decryption are performed at the SD card 10 side, and so it is not necessary for the host device 20 to have any configuration for encryption or decryption, reducing implementation load on the host device. In addition, the host device 20 does not hold a data key Dk itself, nor does a user key Uk.

Instead, the host device 20 has an encrypted data key Enc (Uk:Dk) resulting from encrypting a data key Dk with a user key Uk, user-key identification data UkID corresponding to the user key Uk, and storage information about storage locations in the SD card 10 where plaintext data is stored (alternatively, it receives the storage information from the outside world, as needed). In data write operation, the host device 20 receives such data from the SD card 10 upon completion of the write operation.

In addition, in data read operation, the host device 20 provides data, including user information for identifying users, storage information, etc., to the SD card 10, which in turn provides desired plaintext data Data to the host device 20. The location of data to be written (storage location), for example, may be controlled by a file system provided at the host device 20.

Since a file system is generally involved in the device such as a digital camera or personal computer, it is preferable to utilize the file system originally provided at the host device 20, instead of implementing a separate file system on the SD card 10. Of course, it is possible to implement a separate file system on the SD card 10 for controlling the location of data to be written, etc., by the file system.

FIG. 2 illustrates another mode of use (Usage Scene B). This is the case where the data Data that has been written by a user A to the SD card 10 is selectively allowed to be provided to another user, e.g., a user B. Since such allowance is selectively granted to particular persons, personal information is well protected and data interoperability is assured between the particular persons. When granting such allowance, the user A rewrites an ID table TAB stored in the SD card 10, allowing the data encrypted with its user key UkA to be provided to the user B.

After the ID table TAB is rewritten in this way, the user B may present the user ID, etc., and access the SD card 10 to decrypt and read the data Data encrypted with the user key UkA.

On the other hand, if other users, e.g., users C, D, . . . , and so on who are not allowed to use data by the user A accessed the SD card 10, the user key UkA will not be read by the unauthorized users, nor can the plaintext data Data be provided thereto.

Figure 3:
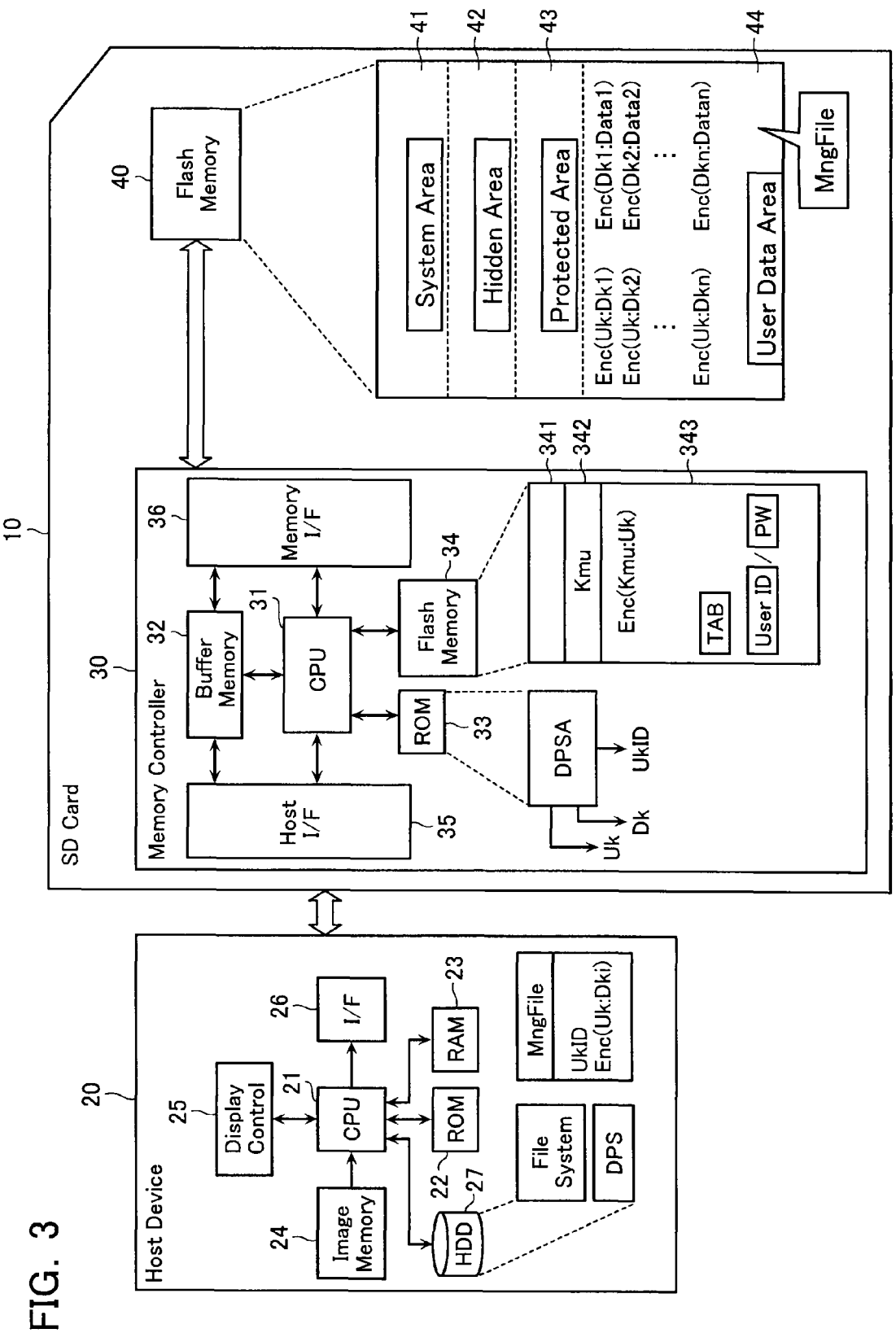
FIG. 3 is a block diagram illustrating a specific configuration of an SD card 10 and a host device 20 in a data protection system according to an embodiment of the present invention.

Referring now to FIG. 3, a specific configuration of the SD card 10 and one host device 20 in this system will be described below.

The SD card 10 comprises a memory controller 30 and a flash memory 40, which is a non-volatile memory. The SD card 10, an example of secure storage media for securely storing data, includes a system area 41, a hidden area 42, a protected area 43, and a user data area 44 in the flash memory 40. Data is stored in the respective areas 41 to 44 as appropriate.

The system area 41 is a read-only area that is accessible to the outside world of the SD card 10. The hidden area 42 is a read-only area that is referred to by the SD card 10 itself, but by no means accessible to the outside world. The protected area 43 is such an area that can be read and written to from the outside world of the SD card 10 upon a successful authentication. The user data area 44 is such an area that can be freely read and written to from the outside world of the SD card 10.

As an example, the host device 20 comprises: a CPU (Central Processing Unit) 21, a ROM (Read Only Memory) 22, a RAM (Random Access Memory)23, an image memory 24, a display control unit 25, an interface (I/F) 26, and a hard disk drive (HDD) 27, which are generally implemented in a computer. The host device 20 stores a file system and DPS (Data Protection System) program in the HDD 27 for performing data write and read operations on the SD card 10.

The file system used herein may include a common file system that is implemented in a general personal computer, etc. In addition, the DPS program causes the DPSA program described below to perform data write and read operations with a double encryption key scheme. The DPS program is also responsible for card authentication procedures for authentication of the SD card 10 with the DPSA program, user authentication for authentication of users themselves, and so on.

Figure 4:
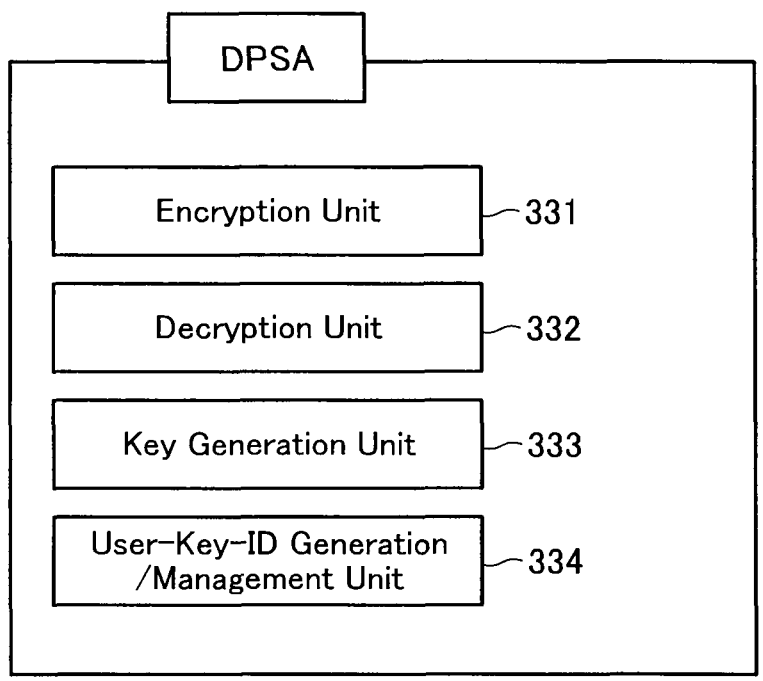
FIG. 4 is a block diagram illustrating the functions of a memory controller 30 provided by DPSA program.

The memory controller 30 comprises: a CPU 31 for governing the entire operation of the memory controller 30; a host-side interface 35 responsible for communicating data with a buffer memory 32; a ROM 33, a flash memory 34, and a host device 20; and a memory-side interface 36 to the memory 40. The buffer memory 32 assumes the role to temporarily retain such data that is transmitted from the host device 20 to the flash memory 40, or that is read from the flash memory 40 for transmission to the host device 20. Note that the flash memory 34 is implemented in the memory controller 30. The DPSA program, which is stored in the ROM 33 and executed in the memory controller 30, is responsible for encryption/decryption of data, generation of user keys and data keys used for encryption, generation and management of user-key identification data, etc. As illustrated in FIG. 4, the DPSA program embodies the following units within the memory controller 30: an encryption unit 331 responsible for encryption of data; a decryption unit 332 responsible for decryption of data; a key generation unit 333 for generating user keys and data keys for encryption; and a user-key generation/management unit 334 for generating and managing user-key identification data (user key ID) corresponding to user keys. Alternatively, the functions of the encryption unit 331 and the decryption unit 332 mentioned above may be achieved by adding functions of data encryption/decryption to the buffer memory 32 and providing data keys for encryption/decryption via the CPU 31.

The flash memory 34, which is provided in the memory controller 30, assumes the role to securely store data necessary for various kinds of authentication procedures performed in execution of the DPSA program, encryption/decryption of data, and so on. In the present embodiment, as with the flash memory 40, the flash memory 34 includes a system area 341, a hidden area 342, and a protected area 343, and data is stored in the respective areas 341 to 343 as appropriate.

In this embodiment, the encrypted data Enc(Dk:Data) resulting from encrypting data Data with a data key Dk, as well as the encrypted data key Enc(Uk:Dk) resulting from encrypting a data key Dk with a user key Uk are stored in the user data area 44 of a main storage device, i.e., the flash memory 40. The NAND flash memory 40, which is the main storage device, has a large storage capacity and accessible by the file system of the host device 20. It is preferable to store the encrypted data Enc (Dk:Data) and the encrypted data key Enc(Uk:Dk) in the user data area 44 with large capacity because both has a larger amount of data as the number of data types increases.

In addition, the user key Uk is encrypted with a media-specific key Kmu stored in the hidden area 342 of the flash memory 34. It is then stored in the protected area 343 of the flash memory 34. Since the user key Uk may be set for each user and used in common to different data, it has a small amount of data as compared with the data Data and the data key Dk. Therefore, the flash memory 34 needs to have only a small capacity.

For implementations where the flash memory 34 is not accessible from the host device 20, the media-specific key Kmu may be omitted because the flash memory 34 can be considered as the protected area 343. This means that the user key Uk may be stored without encryption.

Alternatively, the flash memory 34 may be omitted by using the NAND flash memory 40. If so, the hidden area 42 or the protected area 43 is used. In this case, such keys are used as media-specific keys Kmu that are stored in the hidden area 42 of the flash memory 40. In addition, the protected area 43 of the flash memory 40 is used as the protected area.

Figure 5:
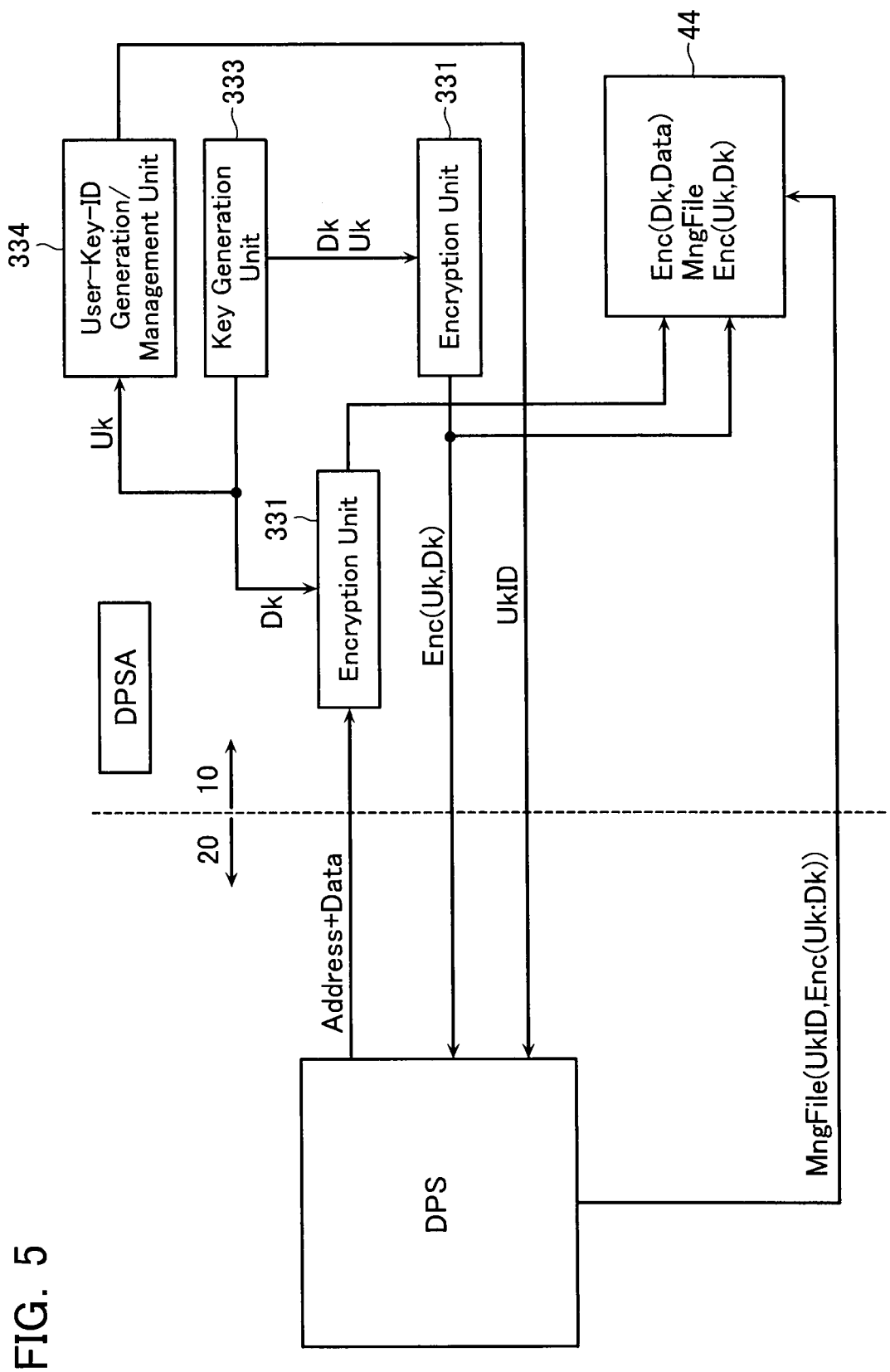
FIG. 5 is a functional block diagram illustrating the functions of respective parts provided by the DPSA program.
Figure 6:
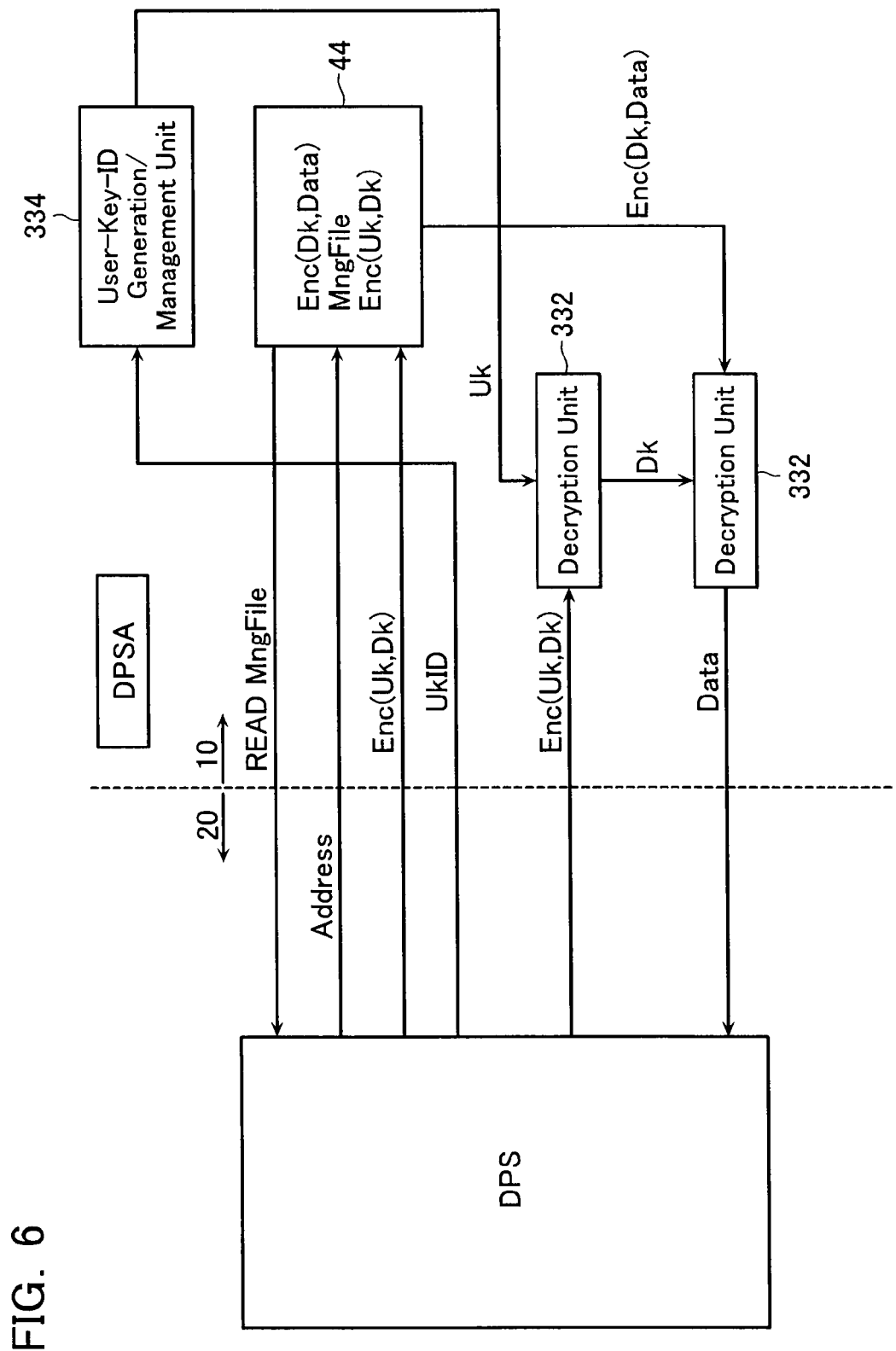
FIG. 6 is a functional block diagram illustrating the functions of respective parts provided by the DPSA program.

Referring now to FIGS. 5 and 6, the functions of respective parts provided by the DPSA program will be described below. FIG. 5 excerpts those parts that operate when data is written from the host device 20 to the SD card 10, whereas FIG. 6 excerpts other parts that operate when data is read from the SD card 10 to the host device 20 after decryption.

Referring first to FIG. 5, the configuration that operates in writing data will be described below. The DPS program within the host device 20 transmits to the SD card 10 data Data to be encrypted and written to the SD card 10, together with an address Address of the user data area 44 in the flash memory 40. The encryption unit 331 encrypts the data Data with the data key Dk generated at the key generation unit 333 to generate encrypted data Enc(Dk:Data), which is in turn stored at the specified address in the user data area 44.

In addition, the key generation unit 333 generates a user key Uk, which is different for each user and used in common to multiple types of data keys. The encryption unit 331 encrypts the data key Dk with the user key Uk to generate an encrypted data key Enc (Uk, Dk), which is in turn stored in the user data area 44. Further, the user key Uk is encrypted with a media-specific key Kmu and stored in the protected area 343. The media-specific key Kmu is stored in the hidden area 342.

When a new user key Uk is generated by the key generation unit 333, the user-key-ID generation/management unit 334 generates user-key identification data UkID corresponding to the user key Uk, and manages the user-key identification data UkID in correspondence with the user key Uk. The generated user-key identification data UkID is transmitted to the host device 20 together with the encrypted data key Enc(Uk:Dk).

Based on the received user-key identification data UkID and the encrypted data key Enc(Uk:Dk), the DPS program within the host device 20 updates a data-key management file MngFile and responses again to the SD card 10, causing it to store the data-key management file MngFile in its user data area 44. The data-key management file MngFile contains the following: user-key identification data UkID; an encrypted data key Enc (Uk:Dk); addresses in the user data area 44 where data Data is stored; a user-rule file URule that specifies data utilization rules (sharable/non-sharable, read-only/editable, printable/unprintable, copiable or movable/non-copiable or unmovable, etc.); metadata relating to the encrypted data, and so on. These types of metadata are encrypted with Uk together with the data key Dk.

Referring now to FIG. 6, the function of each part in reading data will be described below. In read operation, the DPS program in the host device 20 reads the data-key management file MngFile stored in the user data area 44, which is in turn temporarily retained in the RAM 23. Based on the data-key management file MngFile, the DPS program identifies the data Data to be read and transmits the encrypted data key Enc(Uk:Dk) corresponding to that data to the SD card 10, together with the user-key identification data UkID and the address in the user data area 44.

The user-key-ID generation/management unit 334 identifies the user key Uk based on the received user-key identification data UkID. The decryption unit 332 decrypts the received encrypted data key Enc (Uk:Dk) with the identified user key Uk to obtain the data key Dk. The decryption unit 332 further decrypts the encrypted data Enc(Dk:Data) stored in the user data area 44 with the data key Dk to obtain the data Data. The DPSA program provides the obtained data to the host device 20.

Referring now to the timing charts of FIGS. 7 and 8, the data write and read operations of this system will be described below.

Figure 7:
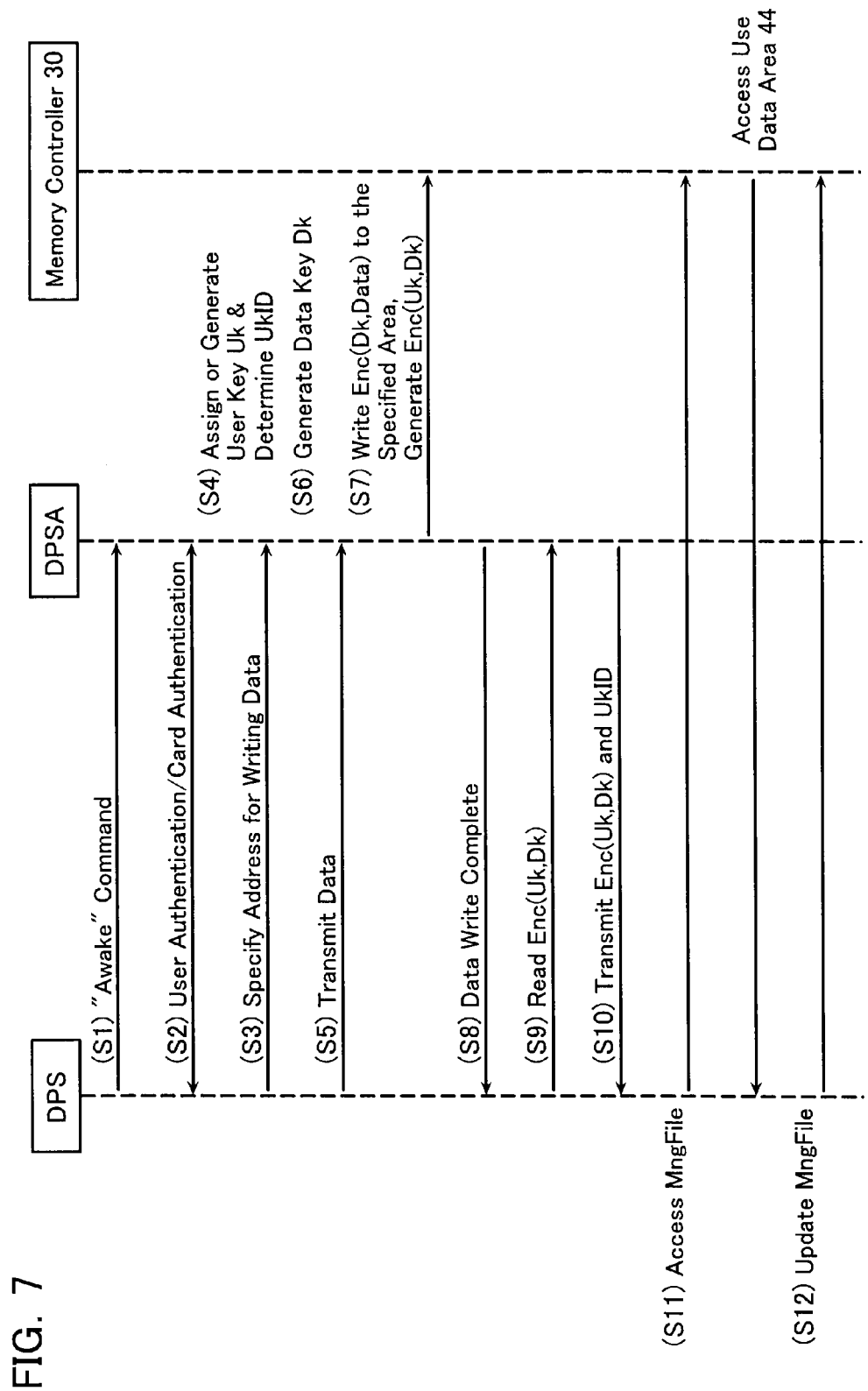
FIG. 7 is a timing chart illustrating the operation of the data protection system according to the present embodiment.

Referring first to FIG. 7, a data write operation is described. In data write operation, DPS program in the host device 20 first issues an "Awake" command to launch DPSA program (S1).

Then, the DPS program and the DPSA program perform user authentication as well as card authentication procedures based on a user ID, a password, etc. (S2).

In user authentication, when the DPS program transmits a user ID and a password to the DPSA program, the DPSA program causes the user-key generation/management unit 334 to operate and determine whether or not a match is found for the user ID and password. If a match is found, then the authentication is considered successful, and the procedure proceeds to the next step.

The card authentication is a process for checking the validity of the card itself. The card authentication may be omitted from the implementation.

It should be noted that the scheme used in card authentication is not limited to any specific scheme, and indeed, may be PKI (Public Key Infrastructure) or a common secret key scheme. The latter is preferable because it imposes less implementation load.

Upon completion of the user authentication, the DPS program transmits to the SD card 10 a write instruction for the data Data to be encrypted and written to the SD card 10, together with the address Address of the storage location to be written to (S3). Note that if authentication fails, then the DPSA program denies reception of step (S3) as an error.

Upon reception of the write instruction, the DPSA program causes the key generation unit 333 to issue a user key Uk if no user key has been issued for that user, and further causes the user-key-ID generation/management unit 334 to determine user-key identification data UkID corresponding to the user key Uk (S4). The user-key identification data UkID and the user key are managed in correspondence with each other by the user-key-ID generation/management unit 334. Note that if a user key has already been issued for that user, then the already-issued user key is assigned to the user.

Subsequently, the DPS program transmits the data Data for writing, as well as the address in the user data area 44 at which the data is to be written to the SD card 10 (S5).

Upon receipt of the data Data, the DPSA program causes the key generation unit 333 to generate a data key Dk for encrypting the received data Data (S6). Then, the data Data is encrypted with the data key Dk at the encryption unit 331 to generate encrypted data Enc(Dk:Data), which is in turn written to the specified address in the user data area 44 (S7). Upon completion of the data write operation, the DPSA program reports to the DPS program (S8). According to the report, the DPS program requests the DPSA program to transmit the encrypted data key Enc(Uk:Dk) (S9). In response to the request, the DPSA program transmits the encrypted data key Enc (Uk:Dk) and the user-key identification data UkID to the DPS program (S10).

Upon confirmation of the encrypted data key Enc(Uk:Dk) and the user-key identification data UkID, the DPS program accesses the data-key management file MngFile stored in the user data area 44 (S11), and updates the data-key management file MngFile based on the received encrypted data key Enc(Uk:Dk) and user-key identification data UkID (S12). Through this process, the write operation from the host device 20 to the SD card 10 is completed. The host device 20 only specifies the destination addresses for writing via the DPS program of the file system, and does not perform other operations such as encryption or the like. Therefore, data protection may be achieved without undue implementation load on the host device.

Figure 8:
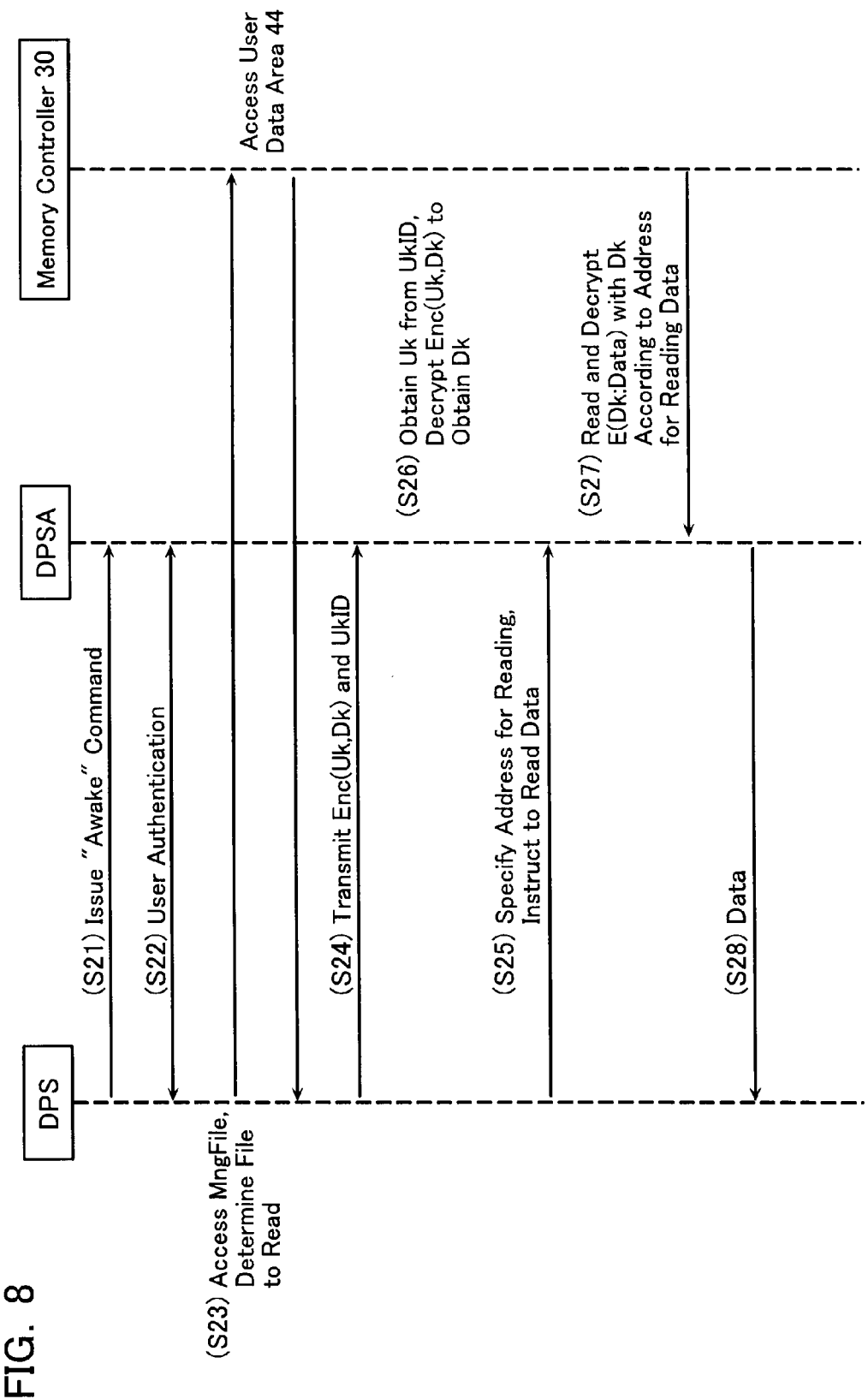
FIG. 8 is a timing chart illustrating the operation of the data protection system according to the embodiment.

Referring now to FIG. 8, a data read operation will be described below. In reading data, DPS program in the host device 20 issues, as in the write operation, an "Awake" command to launch DPSA program (S21).

Then, the DPS program and the DPSA program perform user authentication and card authentication procedures based on a user ID, a password, etc. (S22). Upon completion of the authentication procedures, the DPS program accesses the data-key management file MngFile stored in the user data area 44 to determine a file relating to the data Data to be read (S23).

Subsequently, the DPS program transmits to the DPSA program the encrypted data key Enc(Uk:Dk) and the user-key identification data UkID corresponding to the data Data to be read (S24). Further, it specifies the address of the user data area 44 at which the data Data to be read is stored and sends an instruction to read the data Data therefrom (S25).

Based on the received user-key identification data UkID, the DPSA program refers to the user-key-ID generation/management unit 334 to obtain the corresponding user key Uk. Then, the encrypted data key Enc(Uk:Dk) is decrypted with the user key Uk to obtain the data key Dk (S26).

Then, the encrypted data Enc(Dk:Data) relating to the target data Data is read from the specified address and decrypted with the data key Dk to obtain the data Data (S27). The obtained data is transmitted to the host device 20 (S28). Through this process, the data read operation is completed.

Figure 9:
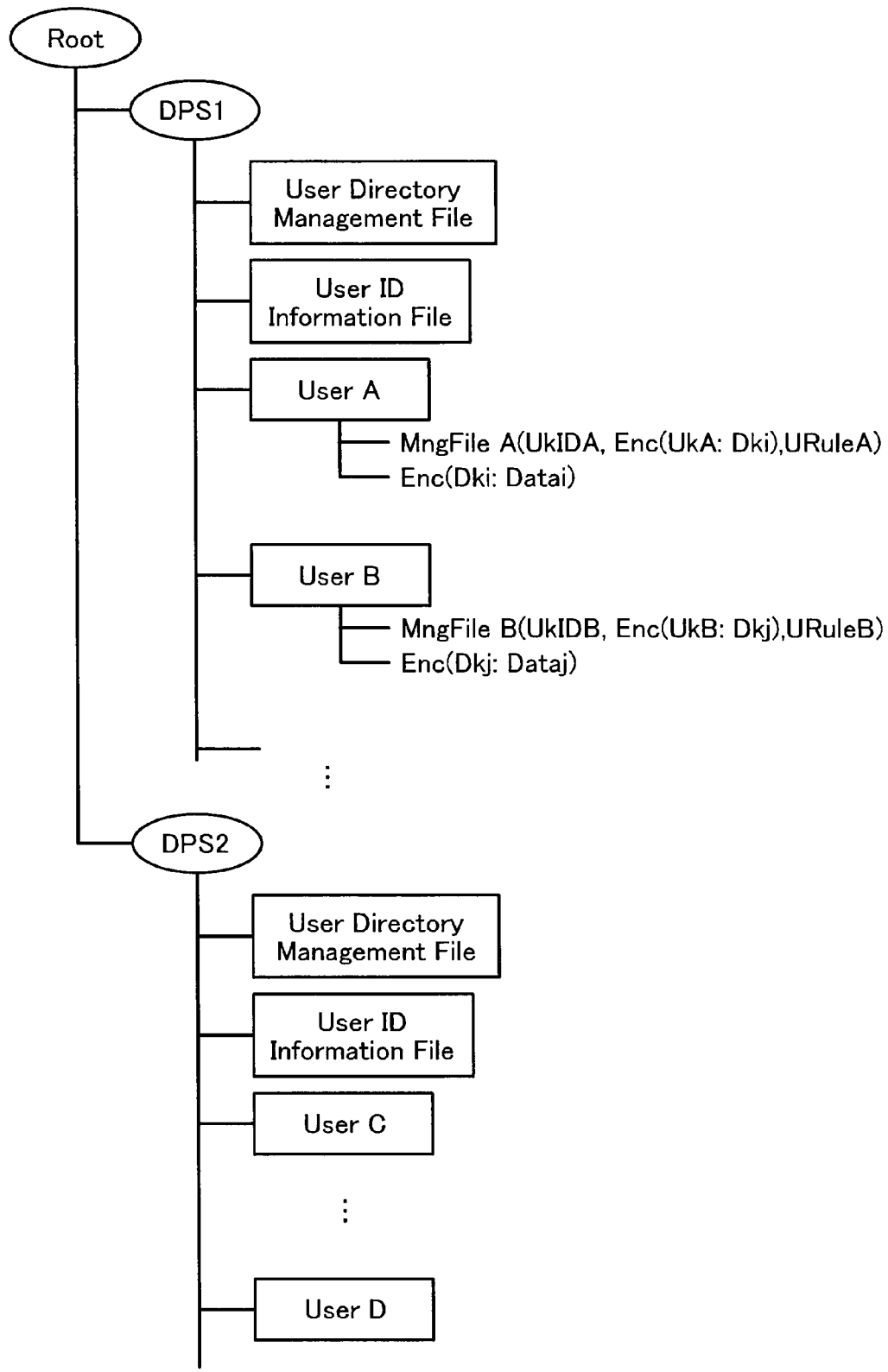
FIG. 9 illustrates a directory structure of the SD card 10 according to the embodiment.

FIG. 9 illustrates a directory structure of the user data area 44 in the SD card 10 according to the embodiment. As illustrated in FIG. 9, a directory DPS is formed in the SD card 10 that is managed by the DPS program. Further, different directories UserA, UserB, . . . , and so on are formed in the directory DPS for different users A, B, C, D, . . . , and so on.

Each of the different directories User stores a data-key management file MngFile and a plurality of encrypted data files Enc(Dki, Datai), as mentioned above.

In addition, user directory management files for managing the user directories and user ID information files for managing user IDs are stored in parallel to the different directories User. As described below, the user ID information files are associated with the above-mentioned data-key management files MngFile and the ID table TAB.

The ID table TAB is rewritten by each user when that user attempts to share data with another particular user; the user may write such information to this table, indicating that another user B is also allowed to use its own user key UkA. Writing such information to the ID table TAB enables the user B to share the user A's information (Usage Scene B (see FIG. 2)). The ID table TAB is stored in the protected area 343 of the flash memory 34.

Figure 10:
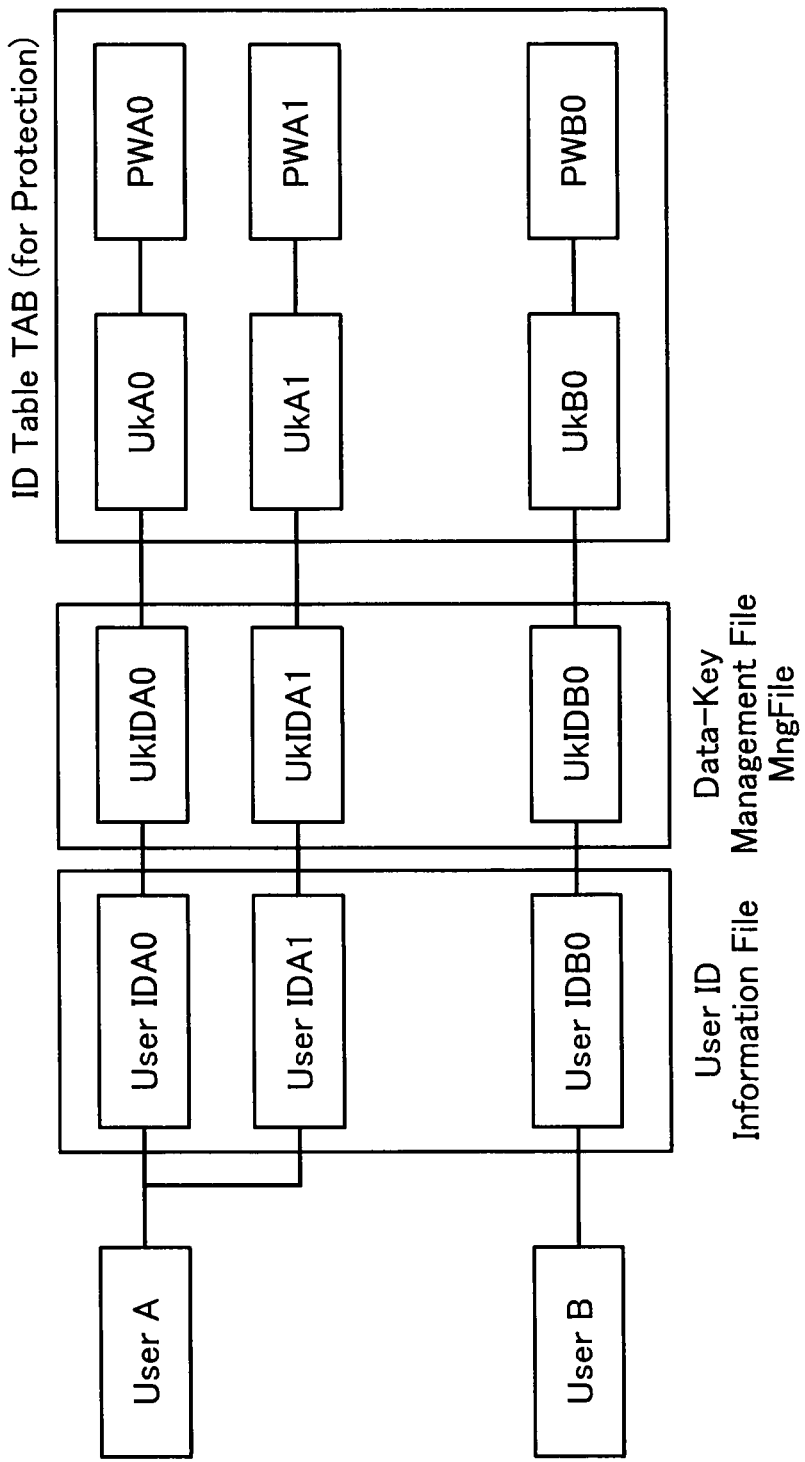
FIG. 10 illustrates a relationship between users and user IDs, UkIDs, user keys, and passwords according to the embodiment.

Referring now to FIG. 10, description is made on a relationship between the internal configuration of the ID table TAB, a data-key management file MngFile, and a user ID information file.

The users A and B have respective user IDs, user-key identification data UkID, user keys Uk, and passwords PW that are stored in the ID table TAB, the data-key management file MngFile, and the user ID information file, respectively, and associated with each other as illustrated in FIG. 10.

The user IDs are managed in the user ID information file. The user-key identification data UkID is managed in the data-key management file MngFile. The user keys Uk and passwords are securely managed in the ID table TAB.

As illustrated in FIG. 10, the users are also allowed to have multiple user IDs. The user ID(s), user-key identification data UkID, user key Uk, and password are considered as one set. The user ID A0 corresponds to user-key identification data UkIDA0, a user key UkA0, and a password PWA0. In FIG. 10, the user A represents the user with two user IDs (A0, A1) and the user B with one user ID (B0).

FIG. 11 illustrates an example configuration of the ID table TAB in conjunction with FIG. 10 where two users A and B as well as three user IDs (A0, A1, B0) exist. The ID table TAB illustrates which user-key identification data is allowed to use a user key Uk associated with a certain user ID.

It is not allowed, in the initial state, to share a user key between different user IDs. For example, if the user A is subject to user authentication with the user ID A0, the user A may only use the user key UkA0 under the user ID A0. Although the user A holds two user IDs (A0, A1), it cannot use the user key UkA1 corresponding to the user ID A1 under the user ID A0. Similarly, the user B is only allowed to use a user key UkB0.

FIG. 12 schematically illustrates an internal state of the ID table TAB when sharing of user keys and data is allowed. Here, it is assumed that after the user A is subject to user authentication with the user ID A0, the user B (the one with the user key UkB0 and user-key identification data UkIDB0) is allowed to share the user key UkA0. Accordingly, the permission flag of the user IDA0 for the user-key identification data UkIDB0 changes from "not allowed" to "allowed" status in the ID table TAB. Accordingly, if the user B was subject to user authentication with the user ID B0, it is allowed to share the user key UkA0. Thus, it is now possible to decrypt the data key that is encrypted with the user key UkA0, enabling decryption of the data Data that is encrypted with the data key Dk encrypted with the user key UkA0 and sharing of data between the user A and the user B.

Providing multiple user IDs to a user is advantageous because a user may manage plural pieces of data with different user keys, depending on whether or not the user wants to share data with others, thereby simplifying the data management. If only one user key is allowed to be held by a user, the user cannot easily share or unshare data with other users. Unshared data may be encrypted with the user key UkA1 that is not allowed to be shared.

In the ID table TAB as illustrated in FIG. 12, since the user B does not allow UkB0 to be shared with the user A, data is only shared in a one-way relationship, from the user A to the user B.

Figure 13:
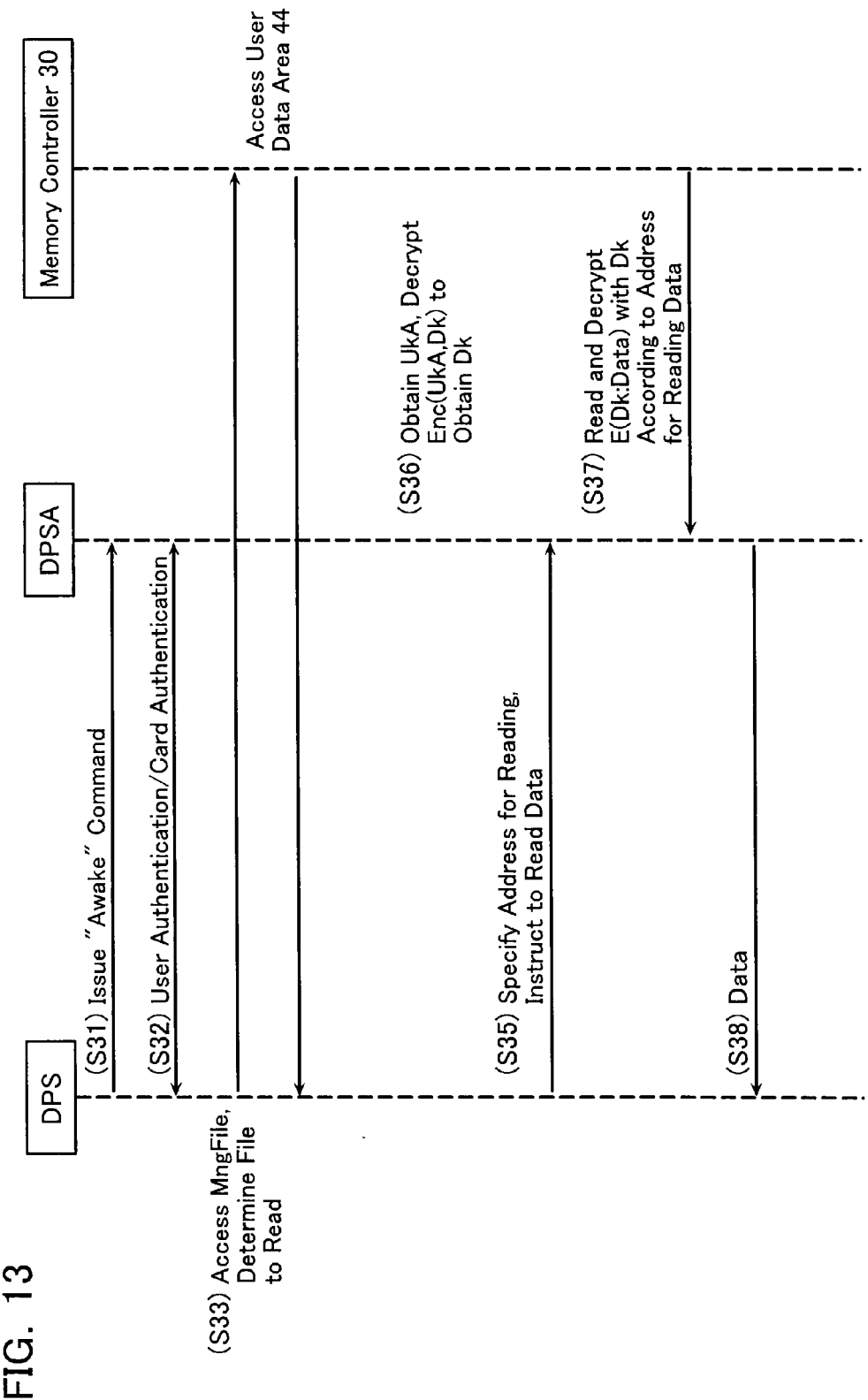
FIG. 13 is a timing chart illustrating the operation of the data protection system according to the embodiment.
Figure 14:
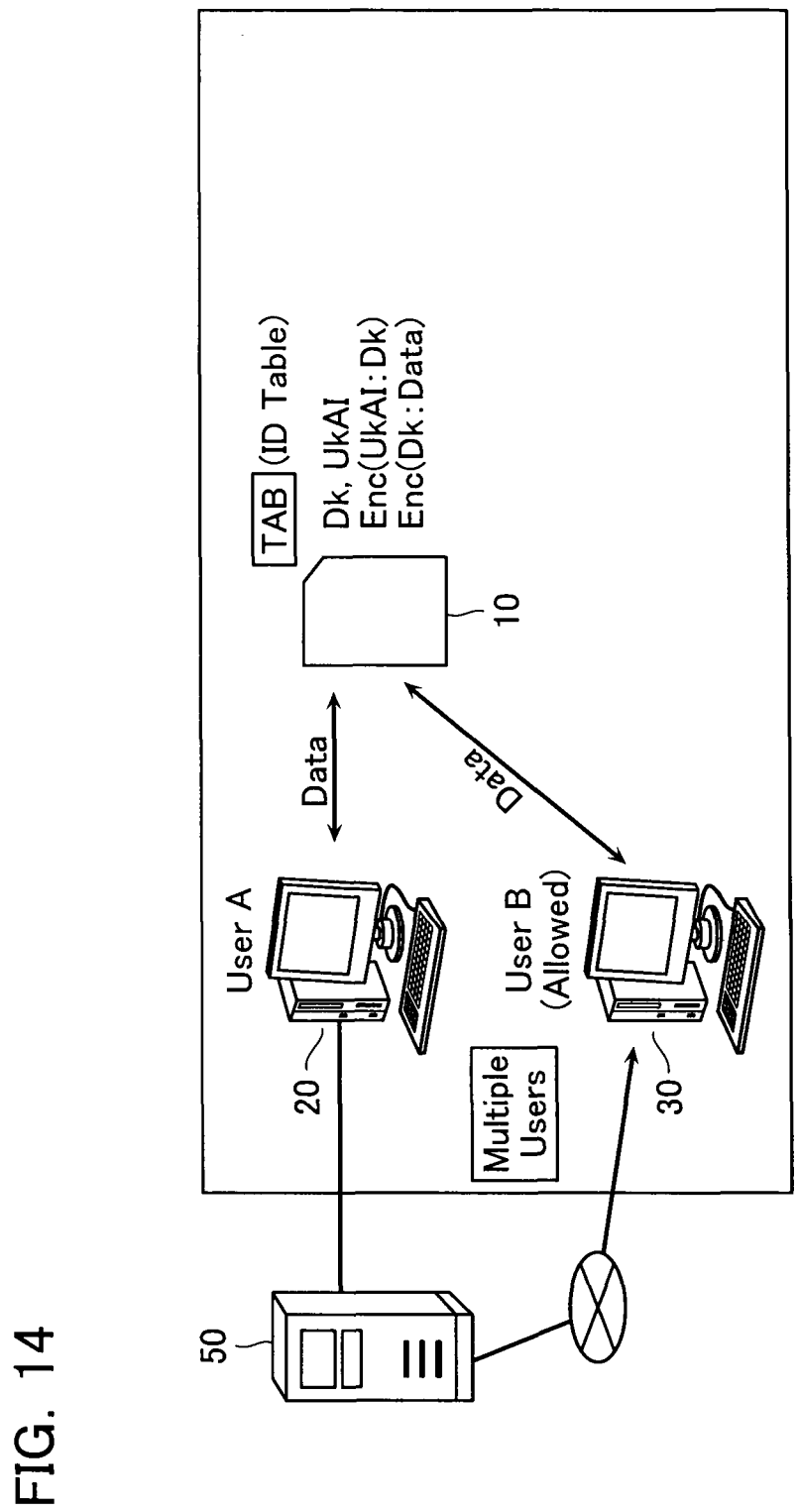
FIG. 14 illustrates a variation of the embodiment of the present invention.

Referring now to FIG. 13, another read operation will be described below where the user B shares information of the user A (Usage Scene B). It is assumed, for simplicity, that each user has one user key UkA and one user key UkB.

Firstly, DPS program in the host device 20 owned by the user B issues an "Awake" command to launch DPSA program (S31).

Then, the DPS program and the DPSA program perform user authentication/card authentication procedures based on a user ID, a password, etc. (S32). At this moment, based on the obtained user ID, the DPSA program refers to the above-mentioned ID table TAB and determines whether the user in question is allowed to use any user key of other users. In this case, consider that the user A holds one user key UkA and that it is determined that the user key UkA is allowed to be used by the user B.

Upon completion of the above-mentioned authentication procedures (S32), the DPS program accesses the data-key management file MngFile stored in the user data area 44 to determine a file relating to the data Data to be read (S33).

Further, the DPS program specifies the address of the user data area 44 at which the data Data to be read is stored and sends an instruction to read the data Data therefrom (S35).

If the data Data corresponding to the read instruction is encrypted with the user key UkA, it is determined that the user key UkA is allowed to be used by the user B, as described above. According to the determination, the DPSA program decrypts the encrypted data key Enc(UkA:Dk) with the user key UkA to obtain the data key Dk (S36). Then, the encrypted data Enc(Dk:Data) relating to the data Data in question is read from the specified address and then decrypted with the data key Dk to obtain the data Data (S37). The obtained data is transmitted to the host device 20 (S38). Through this process, the data read operation is completed.

In contrast, if any read requests are made by other users who are not allowed to share data by the user A, these requests are denied based on the ID table TAB. Therefore, both data interoperability and information protection are achieved.

While an embodiment of the present invention has been described, the present invention is not intended to be limited to the disclosed embodiment and various changes, additions or the like may be made thereto without departing from the spirit of the invention. For example, although the above-mentioned embodiment has been described in the context of the user key Uk being generated at the memory controller 30, such configuration may also be utilized where user keys are obtained from an external server 50 as illustrated in FIG. 13. In addition, while the user keys Uk are stored in the protected area 343 in the flash memory 34 under the control of the DPSA program in the above-mentioned embodiment, they may alternatively be stored in the protected area 43 in the flash memory 40.

Further, while the above-mentioned embodiment has been described on the assumption, for simplicity, that one user key is issued for each user, multiple user keys may be issued for each user. In this case, each user may use multiple user keys for different purposes, data, and so on, and allow only some of these user keys to be used by other users.

It is also possible to store the specific range of sharing user keys as well as data keys in the ID table TAB, and allow only some of different data keys encrypted with one user key to be used by other users based on this information.

What is claimed is:

1. A data protection system providing data to a particular host device from a memory card in which the data is stored, and limiting provision of the data to other host devices, the data being encrypted with a double encryption key scheme for encrypting the data with a data key and further encrypting the data key with a user key, the data protection system comprising:
   the host device including
      DPS (Data Protection System) program governing control of writing data to, and reading data from the memory card,
   the memory card including
      a first non-volatile memory as a main storage device, the first non-volatile memory being configured to store a table that includes a plurality of user keys associated with a plurality of users, and that indicates whether each of the plurality of user keys is one of allowed and not allowed to be used by each of the plurality of users;
      a memory controller controlling the first non-volatile memory to govern encryption, decryption, read, and write of the data; and
      DPSA (Data Protection System Agent) program implemented in the memory controller, the DPSA program encrypting the data with the data key and further encrypting the data key with the user key according to an instruction from the DPS program, and then causing the encrypted data and the encrypted data key to be stored in the first non-volatile memory, whereas the DPSA program decrypting the encrypted data with the user key and the data key to read the data according to an instruction from the DPS program, and managing ID information that identifies a user capable of decrypting the encrypted data with the user key,
   in writing the data,
      the DPS program indicating to the DPSA program a storage location in the first non-volatile memory to store the data; and the DPSA program encrypting the data with the data key to obtain encrypted data and further encrypting the data key with the user key to obtain an encrypted data key according to a write instruction from the DPS program, and then causing the encrypted data and the encrypted data key to be stored at the storage location in the first non-volatile memory, in reading the data, the DPS program presenting user information that identifies a user to request the DPSA program to read the desired data;

the DPSA program performing authentication by determining whether the user information presented by the DPS program matches the ID information managed by the DPSA program; and in response to the DPSA program determining a match, and with reference to the ID information, the DPSA program decrypting the encrypted data key with the user key corresponding to the presented user information to obtain the data key, and further decrypting the encrypted data with the data key to read the data to the host device.

2. The data protection system according to claim 1, wherein in writing the data, the DPSA program writing the encrypted data and the encrypted data key to the first non-volatile memory before transmitting the encrypted data key and user-key identification data corresponding to the user key to the host device.

3. The data protection system according to claim 2, wherein each of the host device and the memory card is configured to be able to store a respective data-key management file, the data-key management file managing the encrypted data key and the user-key identification data, and in writing the data, the DPS program updates the data-key management file according to the encrypted data key and the user-key identification data received from the memory card.

4. The data protection system according to claim 1, further comprising a key generation unit in response to a request from the DPS program.

5. The data protection system according to claim 1, wherein the user key is supplied from an external server connected to the host device.

6. The data protection system according to claim 1, wherein the first non-volatile memory comprises a user data area that can be freely read and written from outside world, and a protected area that can be read and written from the outside world upon a successful authentication, and the DPS program indicates an address in the user data area as the storage location.

7. A data protection method for encrypting and storing data in a memory card, for providing the data to a particular host device from the memory card, and for limiting provision of the data to other host devices, the data being encrypted with a double encryption key scheme using a data key and a user key, the memory card having a first non-volatile memory as a main storage device, the first non-volatile memory being configured to store a table that includes a plurality of user keys associated with a plurality of users, and that indicates whether each of the plurality of user keys is one of allowed and not allowed to be used by each of the plurality of users, and a memory controller controlling the first non-volatile memory to govern encryption, decryption, read, and write of data, DPS (Data Protection System) program being implemented in the host device to govern control of writing data to, and reading data from the memory card, DPSA (Data Protection System Agent) program being implemented in the memory controller, the DPSA program encrypting the data with the data key and further encrypting the data key with the user key according to an instruction from the DPS program, and then causing the encrypted data and the encrypted data key to be stored in the first non-volatile memory, whereas the DPSA program decrypting the encrypted data with the user key and the data key to read the data according to an instruction from the DPS program, and managing ID information that identifies a user capable of decrypting the encrypted data with the user key, the data protection method comprising:

in writing the data, indicating, by the DPS program, to the DPSA program a storage location in the first non-volatile memory to store the data; and encrypting, by the DPSA program, the data with the data key to obtain encrypted data and further encrypting the data key with the user key to obtain an encrypted data key according to a write instruction from the DPS program, and then causing the encrypted data and the encrypted data key to be stored in the first non-volatile memory, in reading the data, presenting, by the DPS program, user information that identifies a user to request the DPSA program to read the desired data;

performing authentication, by the DPSA program, by determining whether the user information presented by the DPS program matches the ID information managed by the DPSA program; and in response to determining a match, by the DPSA program, and with reference to the ID information, decrypting, by the DPSA program, the encrypted data key with the user key corresponding to the presented user information to obtain the data key, and further decrypting the encrypted data with the data key to read the data to the host device.

8. The data protection method according to claim 7, wherein in writing the data, the DPSA program writing the encrypted data and the encrypted data key to the first non-volatile memory before transmitting the encrypted data key and user-key identification data corresponding to the user key to the host device.

9. The data protection method according to claim 7, wherein the user key is supplied from an external server connected to the host device.

10. The data protection method according to claim 8, wherein each of the host device and the memory card is configured to be able to store a respective data-key management file, the data-key management file managing the encrypted data key and the user-key identification data, and in writing the data, the DPS program updates the data-key management file according to the encrypted data key and the user-key identification data received from the memory card.

11. The data protection method according to claim 10, wherein the first non-volatile memory comprises a user data area that can be freely read and written from outside world, and a protected area that can be read and written from the outside world upon a successful authentication, and the DPS program indicates an address in the user data area as the storage location.

12. A memory card with functions for encrypting and storing data therein, for providing the data to a particular host device, and for limiting provision of the data to other host devices, the data being encrypted with a double encryption key scheme for encrypting the data with a data key and further encrypting the data key with a user key, the memory card comprising:

a first non-volatile memory as a main storage device, the first non-volatile memory being configured to store a table that includes a plurality of user keys associated with a plurality of users, and that indicates whether each of the plurality of user keys is one of allowed and not allowed to be used by each of the plurality of users;

a memory controller controlling the first non-volatile memory to govern encryption, decryption, read, and write of the data; and DPSA (Data Protection System Agent) program implemented in the memory controller, the DPSA program encrypting the data with the data key and encrypting the data key with the user key according to an instruction from DPS (Data Protection System) program implemented in the host device that governs control of writing data to, and reading data from the memory card, and then causing the encrypted data and the encrypted data key to be stored in the first non-volatile memory, whereas the DPSA program decrypting the encrypted data with the user key and the data key to read the data according to an instruction from the DPS program, and managing ID information that identifies a user capable of decrypting the encrypted data with the user key, the DPSA program performing if a data write instruction is received from the DPS program along with specification of a storage location in the first non-volatile memory to store the data, encrypting the data with the data key to obtain encrypted data and further encrypting the data key with the user key to obtain an encrypted data key according to the write instruction, and then causing the encrypted data and the encrypted data key to be stored in the first non-volatile memory; and if a read instruction for reading the desired data is received from the DPS program along with presentation of user information that identifies a user, authentication by determining whether the user information presented by the DPS program matches the ID information managed by the DPSA program, and in response to the DPSA program determining a match, decrypting the encrypted data key with the user key corresponding to the presented user information with reference to the ID information to obtain the data key, and further decrypting the encrypted data with the data key to read the data to the host device.

13. The memory card according to claim 12, wherein in writing the data, the DPSA program writing the encrypted data and the encrypted data key to the first non-volatile memory before transmitting the encrypted data key and user-key identification data corresponding to the user key to the host device.

14. The data protection system according to claim 1, wherein the first non-volatile memory of the memory card is configured to store a password in a corresponding relationship with the ID information that identifies the user.

* * * * *